V. DE ROJA.
BOLT.
APPLICATION FILED JUNE 28, 1917.
1,259,214. Patented Mar. 12, 1918.
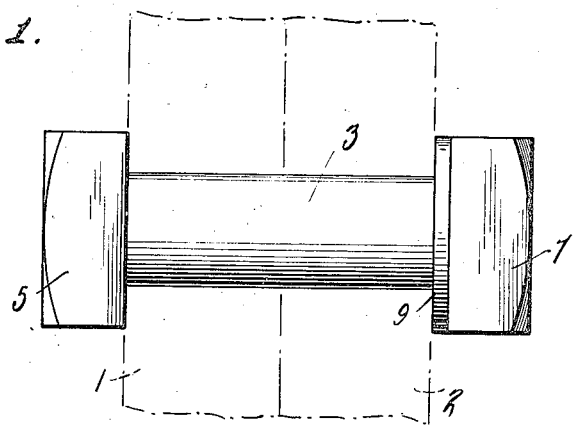
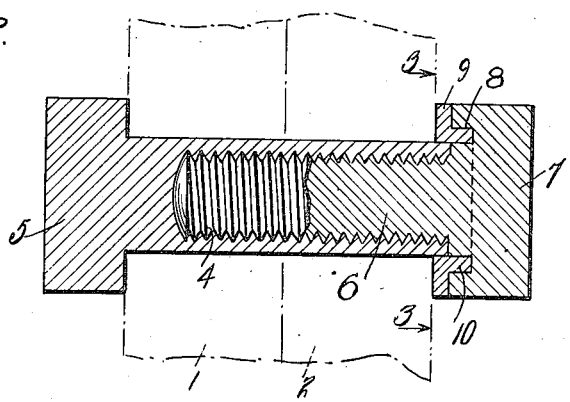
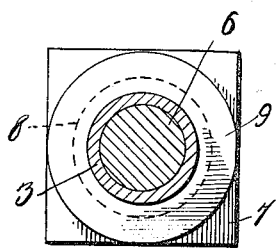
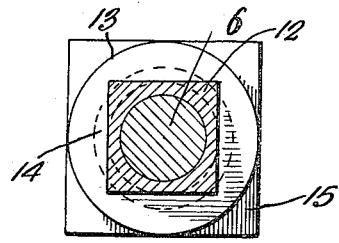
WITNESSES
W. C. Fielding
J. O'Connell
INVENTOR
Victor De Roja
BY Richard Owen
ATTORNEY

UNITED STATES PATENT OFFICE.

VICTOR DE ROJA, OF BLOOMFIELD, NEW JERSEY.

BOLT.

1,259,214.   Specification of Letters Patent.   Patented Mar. 12, 1918.

Application filed June 28, 1917. Serial No. 177,550.

*To all whom it may concern:*

Be it known that I, VICTOR DE ROJA, a citizen of the United States, residing at Bloomfield, in the county of Essex and State of New Jersey, have invented certain new and useful Improvements in Bolts, of which the following is a specification.

This invention relates to bolts and the primary object of the invention is to provide a bolt which can be secured in position without the use of a nut and is not apt to become casually disengaged with the object to which it is attached.

Another object is to provide a bolt of the type mentioned, including a pair of complementary members adapted to be passed through the object to be secured and having such interlocking engagement with one another as to preclude the probability of accidental displacement.

A further object of the invention is to provide a bolt of the above designated character having a washer associated therewith in a peculiar and novel manner.

The above and other objects and advantages of this invention will be in part described and in part understood from the following description of the present preferred embodiment, the same being illustrated in the accompanying drawings in which—

Figure 1 is an elevation showing the application of my improved bolt.

Fig. 2 is a longitudinal sectional view of the bolt as applied.

Fig. 3 is a cross sectional view taken on the line 3—3 of Fig. 2, and

Fig. 4 is a view similar to Fig. 3 but showing a modified form of the invention.

In the drawings, the numerals 1 and 2 designate the two members which are to be secured together. 3 indicates a hollow sleeve passing through said members from one side and provided with interior screw threads 4. This sleeve may be either round or square in cross section and has one end thereof closed and equipped with a large head 5. Passing through the members 1 and 2 from the opposite side is a threaded shank 6 which corresponds in length and diameter to the interior of the sleeve 3 and is adapted to be received therein as shown. On one end of this shank 6 is formed an enlarged head 7, provided on its under surface with a circular groove 8 which surrounds the shank 6 and is spaced a certain distance therefrom. Between this groove and the said shank there is provided an annular surface or shoulder corresponding in diameter to the outside diameter of the sleeve 3 and adapted to engage the end of the sleeve when the parts are assembled.

Engaged with the member 2 is a washer indicated at 9. This washer is provided with a central opening through which projects the free end of the sleeve 3 and surrounding this opening is equipped with a flange 10 extending outwardly to one side of the washer which flange is adapted to be received in the groove 8 when the two parts of the bolt are secured together. In this connection it will be noted that the threads formed on the bolt extend along the entire length thereof up to the head 7 and it is therefore the purpose of the flange 10 to protect these threads from the deteriorating influence of foreign matter or the natural elements which if permitted to enter through the crevice between the end of threaded sleeve and the head 7 might act upon the threads in such a manner as to cause the two parts of the bolt to bind. This danger is clearly obviated by the present form of washer the flange of which overlaps the end of the sleeve and being received in the groove formed in the head 7 entirely covers the crevice existing between said head and the end of the sleeve.

In Fig. 4 I have shown a modified form of the invention in which the sleeve 3 is shown to be square in cross section as distinguished from the round type of sleeve illustrated in the preceding figures. When using this form of sleeve I provide a washer 13 having a squared bore to conform to the contour of the sleeve extending therethrough and the flange 14 of this washer is preferably circular as shown in the present instance to enter the correspondingly shaped groove formed in the head 15. As the flange does not necessarily encircle the sleeve it is therefore not imperative that the flange should be the same shape as the bore of the washer.

In using my device, the sleeve 3 is passed through the object or objects to be secured with its free end projecting slightly therebeyond. The washer 9 is then placed on the projecting end of the sleeve with its flange facing outwardly and when the shank 6 is engaged with the sleeve this flange is adapted to occupy the recess formed in the under surface of the head 7 secured to the end of the shank.

It is to be understood that my invention is susceptible of various changes in the construction, arrangement and proportion of the several parts thereof and I reserve the right to make all such changes as would come within the scope of the appended claims without departing from the spirit of the invention.

I claim:—

1. The combination with a pair of plates, of an interiorly threaded sleeve, said sleeve being squared in cross section and having one end closed and provided with a head, a washer adapted to be received on the free end of said sleeve and provided with an annular flange projecting outwardly from one side thereof, a threaded shank adapted to be received in said sleeve, a head formed on said shank and adapted to engage the end of said sleeve, said head being provided on its under surface with a circular groove to receive said flange, said groove surrounding said shank and being slightly spaced therefrom.

2. A fastening device, including an interiorly threaded sleeve provided with a head, a threaded shank adapted to enter said sleeve and provided with a head having a groove, and a washer member disposed on said sleeve, entering said groove, and overlapping the sleeve at the free end.

In testimony whereof I affix my signature in presence of two witnesses.

VICTOR DE ROJA.

Witnesses:
ROBERT C. MALONEY,
FREDERICK H. BRANSTATER.